United States Patent [19]
Dutta et al.

[11] Patent Number: 5,987,303
[45] Date of Patent: *Nov. 16, 1999

[54] WIRELESS TRANSMISSION USING FIBER LINK

[75] Inventors: Niloy Kumar Dutta, Annandale; Paul Nathan Freeman, New Providence, both of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,016

[22] Filed: May 29, 1996

[51] Int. Cl.$^6$ ..................................................... H04N 7/173
[52] U.S. Cl. .................. 455/3.1; 455/6.3; 348/6; 348/14; 359/125; 359/137; 359/152
[58] Field of Search ............................... 455/3.1, 5.1, 6.3, 455/67.1, 422; 348/6, 12, 13, 14, 10; 370/328; 359/115, 117, 125, 136–137, 145, 152, 172–173

[56] References Cited

U.S. PATENT DOCUMENTS

| | | | |
|---|---|---|---|
| 5,488,413 | 1/1996 | Elder et al. | 348/13 |
| 5,528,582 | 6/1996 | Bodeep et al. | 348/13 |
| 5,623,422 | 4/1997 | Willliams | 455/5.1 |
| 5,640,196 | 6/1997 | Behrens et al. | 455/6.3 |
| 5,657,374 | 8/1997 | Russell et al. | 370/328 |
| 5,815,794 | 9/1998 | Williams | 348/12 |

*Primary Examiner*—Vu Le

[57] ABSTRACT

A wireless transmission and reception system includes a mixing section using a phase shift keying or quadrature amplitude modulation scheme to modulate a baseband signal, representing voice or data, onto a carrier frequency within the range of standard (cable television format) AM-VSB frequencies. A combiner section combines the modulated carrier signal into a channel of a multiplexed cable television (CATV) signal having two or more channels. The CATV signal is used to modulate a laser source. The laser source generates a laser signal based on the CATV signal. The laser signal is optically coupled into a bidirectional fiber link. The fiber link transmits the laser signal and ultimately converts the laser signal into the electrical CATV signal. A splitting section coupled to the bidirectional fiber link splits the modulated carrier signal from the CATV signal. A demodulating section coupled to the splitting section recovers the baseband signal from the modulated carrier signal. The baseband signal is remodulated onto a carrier signal having a designated wireless frequency and is broadcast into free space using an antenna. Signals received by the antenna from free space are amplified and passed through the bidirectional fiber link.

15 Claims, 4 Drawing Sheets

WIRELESS TRANSMISSION USING FIBER LINK

FIELD OF THE INVENTION

This invention relates generally to wireless voice and data telecommunications, and more particularly to wireless voice and data transmission and reception using installed cable television (CATV) optical fiber trunks.

BACKGROUND OF THE INVENTION

Wireless communications have become a focus of worldwide commercial activity. The goals for the next-generation mobile radio system include providing a wide variety of integrated multimedia services and increasing system capacity. Compared to today's cellular systems, the next-generation mobile or fixed wireless system will have a much higher channel bit rate capability to provide multimedia services to multiple users within each coverage area.

As populations grow and cities develop it becomes necessary to increase the number of cells serving a geographical user area. This includes erecting new antennas and associated infrastructure, which is expensive.

Currently, there is an extensive optical fiber infrastructure installed by the cable television industry. The optical fiber system used for cable television is configured in what is known as the "fiber backbone", as shown in FIG. 1. The fiber backbone 20 includes one or more headends ("HE") 22, which are separated by about 15 km. One or more nodes ("N") 24, 26 are connected to each headend 22 by optical fiber 28, 29. One or more subsidiary sites ("SS") 30, 32 are connected to each node 24, 26 by coaxial cable 34, 35. The subsidiary sites 30, 32 can be, for example, cable television companies or home users.

In practice, video and audio programming is received at the headend 22 (e.g., from a satellite or transmitter). Sixty to one-hundred twenty amplitude modulated vestigial sideband channels of programming are incorporated into a cable television signal. The cable television signal directly modulates a laser source at the headend 22 which generates a laser signal. The laser signal from the headend 22 is coupled into one or more optical fibers 28, 29.

Each node 24, 26 receives the laser signal from an optical fiber 28, 29. The laser signals received at the nodes 24, 26 are converted to electrical form and transmission to a subsidiary site 30, 32 (e.g., a home) is accomplished using the pre-existing coaxial wires 34, 35 and electronic amplifiers (not depicted).

Amplitude modulated vestigial sideband (AM-VSB) transmission over optical fiber is a widely accepted practice in the cable television industry. Given the dominance of cable television in delivering broadband connections to homes in the United States, attention has been given to hybrid transmission systems in which digital signals are transmitted along with the AM video channels. Hybrid systems allow for increased communication services over the existing cable television fiber backbone network.

A previous hybrid transmission approach is to add digital carriers in the unused bandwidth beyond the highest AM-VSB channel. Unfortunately, while the standard analog laser used for CATV transmission can easily accommodate the increased modulation bandwidth, the coaxial wires and electronic amplifiers may not be able to handle the higher frequencies encountered when this previous approach is used.

SUMMARY OF THE INVENTION

The invention provides wireless voice and data transmission and reception using installed cable television (CATV) fiber optic links, which are capable of carrying 60–120 channels of amplitude modulated (AM) signals over a single optical fiber. A hybrid system according to the principles of the invention does not require upgrading of the conventional infrastructure such as, for example, by adding another channel. Instead, a digital channel is substituted in the place of one or more of the existing AM channels of the CATV fiber link. The digital audio format preferred for digital cellular transmission, code division multiple-access (CDMA), utilizes a bandwidth of 2.5 MHz or less and therefore can be transmitted over a substituted channel in such hybrid system with the substitution of just one 4 MHz AM-VSB channel.

One of these standard video format AM-VSB channels, having a designated CATV frequency, is specified for voice band using CDMA technology. The CDMA voice baseband signal has a symbol rate of 1.2288 Mb/s. This baseband signal is modulated onto a carrier signal having the designated CATV frequency using one of the phase shift keying (e.g., BPSK, DPSK, QAM, etc.) schemes. The resultant mixed (AM) signal has a spectrum of width 2.5 MHz under BPSK modulation which is well within one frequency band of a standard AM-VSB signal for a CATV channel. Other modulation formats require less spectral bandwidth. The digital modulated carrier signal is combined into the channel having the designated CATV frequency of the CATV signal. An analog laser source is modulated with the CATV signal. The laser source generates a laser signal based on the CATV signal. The laser signal is coupled into a first bidirectional optical transmitter/receiver ("transceiver") in the installed CATV fiber link. The laser signal is received by a second bidirectional optical transceiver in the CATV fiber link which outputs the electrical CATV signal. The electrical CATV signal is amplified. The digital modulated carrier signal is split from the multiplexed CATV signal. The AM-VSB channels of the CATV signal are separated and passed toward subsidiary sites. The digital modulated carrier signal is demodulated by bandpass filtering to retrieve the original voice CDMA baseband signal. The recovered CDMA signal is remodulated onto a carrier signal having a designated wireless frequency. The remodulated carrier signal is broadcast into free space using an antenna. Signals received by the antenna from cellular radio telephones or other communication devices are amplified and passed to the second bidirectional optical transceiver. The second bidirectional optical transceiver passes the antenna signals back to the headend through the optical fiber link.

Data in binary format at symbol rates of up to 2 Mb/s can be transmitted over installed CATV fiber links using an essentially similar scheme. This data can be delivered to the user with either copper, fiber or wireless media.

Other features and advantages of the invention will become apparent from the following detailed description, taken in conjunction with the accompanying drawing, which illustrate, by way of example, the features of the invention.

DETAILED DESCRIPTION OF THE PREFERRED EMBODIMENT

Figure 1:
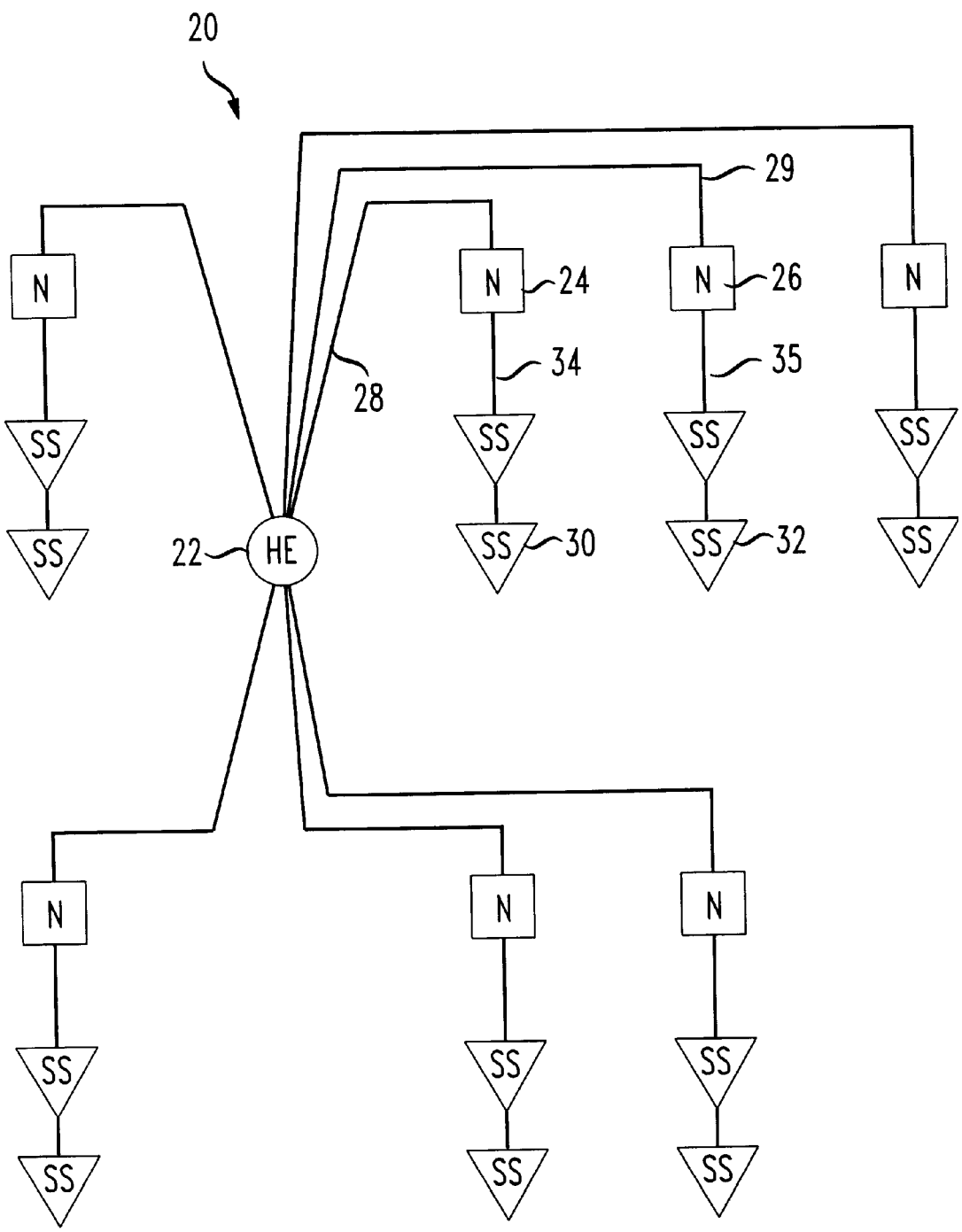
FIG. 1 is a schematic illustration of a conventional fiber backbone.
Figure 2:
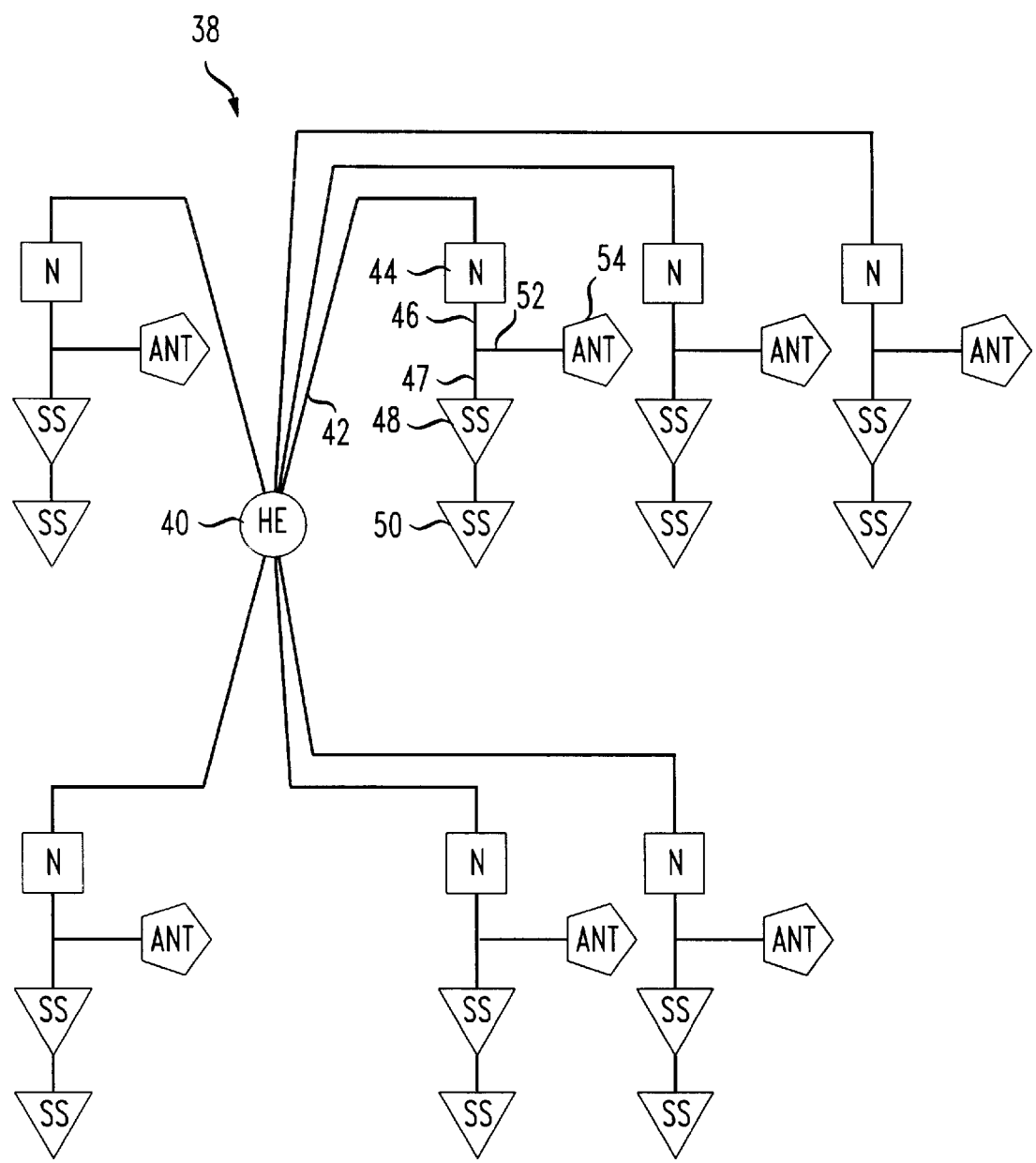
FIG. 2 is a schematic illustration of a transmission and reception system according to the principles of the invention.

A wireless transmission and reception system for transmitting voice or data specified for CDMA protocol into free space uses an installed cable television (CATV) fiber backbone link. Referring to FIG. 2, the wireless transmission and reception system 38 does not require upgrading of the current cable television optical fiber backbone link infrastructure. Instead, a digital channel is substituted in place of one of the existing AM-VSB channels of the CATV link. Since the code division multiple access (CDMA) format preferred for digital cellular transmission utilizes a bandwidth of 2.5 MHz or less, the digital voice or data signals can be transmitted over the substituted digital channel of the wireless transmission system 38 using the frequency allotment of just one 4 MHz AM-VSB channel. The digital modulated carrier signal is combined into the channel having the designated CATV frequency $f_0$ of the CATV signal. An analog laser source disposed at the headend ("HE") 40 is modulated by the CATV signal. The laser source generates a laser signal based on the CATV signal. The laser signal is coupled into the installed CATV fiber 42. The laser signal is received by a bidirectional optical transceiver at node ("N") 44 which outputs the electrical CATV signal 46. The electrical CATV signal 46 is amplified. The digital modulated carrier signal is split from the multiplexed CATV signal 46. The AM-VSB channels 47 of the CATV signal 46 are separated and passed toward subsidiary sites ("SS") 48, 50. The digital modulated carrier signal is bandpass filtered and demodulated to retrieve the original voice CDMA baseband signal. The recovered CDMA signal is remodulated onto a carrier signal having a designated wireless frequency $f_1$. The remodulated carrier signal 52 is broadcast into free space using an antenna ("ANT") 54. Signals received by the antenna 54 from a cellular telephone or other communication device are amplified and transmitted by the bidirectional optical transceiver back to the headend 40 using the same optical fiber 42.

The primary constraint for CDMA systems, power linearity, is easily satisfied with transmission over a CATV laser-to-fiber link as the specifications for AM-VSB far exceed those of CDMA. Noise requirements are likewise lower for the digital CDMA signal. For example, CDMA specifications call for a carrier to co-channel interference power ratio (C/I) of 18 dB, while standard CATV specifications call for carrier to noise ratios of 43 dB or greater. Thus, power linearity and noise requirements are easily satisfied using a CATV fiber link.

Figure 3:
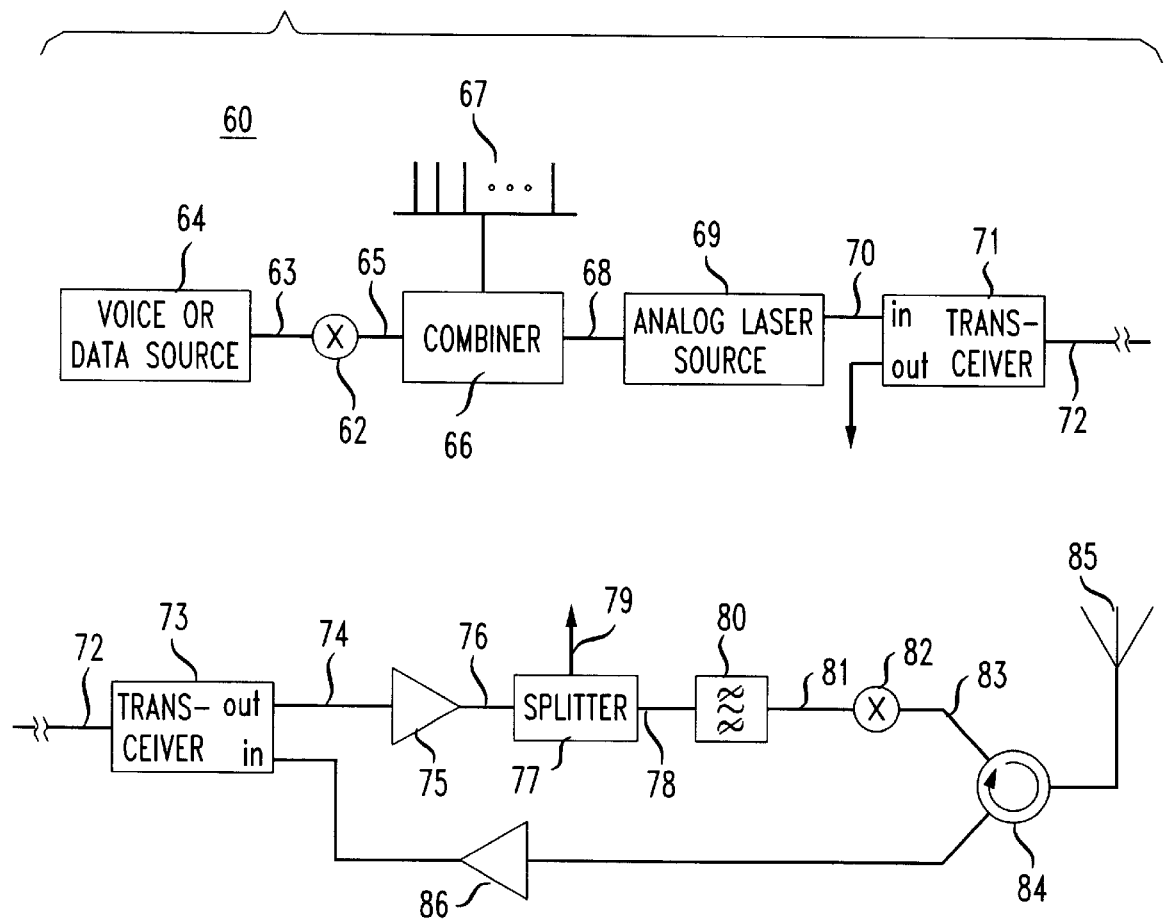
FIG. 3 is a schematic illustration of wireless transmission and reception using a fiber link according to the principles of the invention.

Referring to FIG. 3, a wireless transmission and reception system 60 includes a mixer or modulator 62 for modulating a CDMA baseband voice or data signal 63 (at symbol rates of 1.228 Mb/s and up to 2.0 Mb/s, respectively) from a voice or data source 64 onto a carrier signal having a designated CATV frequency to generate a digital modulated carrier signal 65. Some systems may require external carriers for upconversion or modulation of a baseband signal. A combiner 66 coupled to the modulator 62 receives the digital modulated carrier signal 65 and combines the modulated carrier signal 65 into a channel 67, having a designated CATV frequency, of a multiplexed CATV signal having one or more channels. The combiner 66 outputs the multiplexed CATV signal 68. An analog laser source 69 is coupled to the combiner 66 to receive the CATV signal 68. The analog laser source 69 is directly modulated by the CATV signal 68 and generates a laser signal 70 based on the CATV signal 68. The laser signal 70 is passed to a first bidirectional optical transmitter/receiver ("transceiver") 71. The first bidirectional transceiver 71 optically couples the laser signal 70 into a single-mode optical fiber 72 of the CATV fiber optic link.

The CATV fiber optic link includes a second bidirectional optical transceiver 73 coupled to the optical fiber 72. The second bidirectional optical transceiver 73 in the CATV fiber optic link receives the laser signal transmitted through the optical fiber 72. The second transceiver 73 converts the laser signal back into the electrical CATV signal 74. The optical reception component of the bidirectional transceiver can be a photodetector, such as a p-i-n photodiode.

The CATV signal 74 is amplified by an amplifier 75 or regenerator. The amplified CATV signal 76 is passed to a splitter 77. The splitter 77 draws out the digital modulated carrier signal 78 from the channel at the designated CATV frequency of the CATV signal. The other channels 79 can be passed to other sites. The modulated carrier signal 78 is passed to a bandpass filter 80. The bandpass filter 80 isolates the digital modulated carrier signal 78 for recovery of the CDMA voice or data baseband signal 81.

An upconverter 82 coupled to the bandpass filter 80 modulates the recovered CDMA baseband signal 81 onto a carrier signal having a frequency designated for wireless transmission. The carrier signal 83 is passed to a two-way circulator 84. An antenna 85 is coupled to the circulator 84. The antenna 85 is located proximate the amplifier 75 or regenerator of the installed CATV fiber link. The antenna 85 is used for broadcasting such modulated carrier signal 83 into free space.

The antenna 85 is also used to receive signals from cellular telephones or other communication devices. The received antenna signals are circulated through the two-way circulator 84. An amplifier 86 is coupled to the circulator 84. The antenna signals are amplified 86. The second bidirectional optical transceiver 73 is coupled to receive the amplified antenna signals from the amplifier 86. The second bidirectional optical transceiver 73 couples the antenna signals into the single-mode optical fiber 72. The first bidirectional optical transceiver 71 receives the antenna signals from the single-mode optical fiber 72. The first bidirectional optical transceiver 71 passes the antenna signals for further processing (e.g., back to a headend).

Figure 4A:
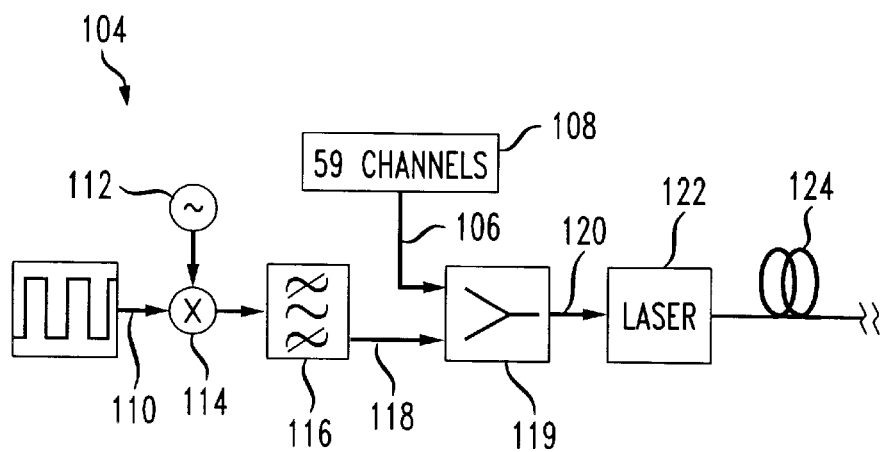
FIGS. 4(a)–(b) depict an exemplary experimental embodiment of a fiber link according to the principles of the invention.
Figure 4B:
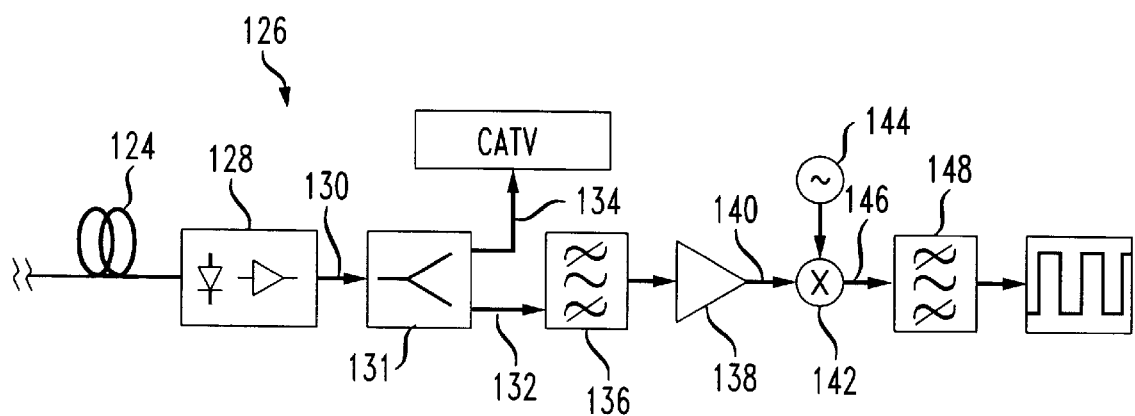

An experimental embodiment of a fiber optic link used for wireless voice and data transmission according to the principles of the invention is shown in FIGS. 4(a) and 4(b). The fiber optic link depicted in FIGS. 4(a) and 4(b) shows a BPSK modulation scheme as an example. However, DPSK, QPSK, or QAM schemes could also be used. Examples of QAM schemes include: 8-QAM, 64-QAM, or 256-QAM. A digital data channel substitutes for one of the AM-VSB channels in a modified sixty channel transmission system.

Referring to FIG. 4(a), in a transmission network 104 fifty-nine standard CATV channels 106 ranging in frequency from 55.25 MHz to 445.25 MHz with 6 MHz separation are generated using an ASX-16B signal generator 108 manufactured by Matrix Test Equipment, Inc. A CDMA baseband signal 110 is simulated by a 2 MHz pseudo-random bit sequence. The 2 MHz bit sequence 110 is modulated, by binary phase shift keying (BPSK), onto a 229.25 MHz carrier signal 112 using a double-balanced mixer 114. This carrier signal 112 frequency corresponds to CATV channel twenty-four which is turned off on the CATV signal generator 108.

A tunable bandpass filter 116 is used to isolate the BPSK data channel (i.e., channel twenty-four) from the other fifty-nine CATV channels. The BPSK carrier signal 118 is then combined 119 with the other CATV channels 106 into the multiplexed CATV signal 120.

The CATV signal 120 is used to directly modulate an analog 1.3 μm DFB laser source 122. The laser source 122 outputs a laser signal, which is directly coupled into a single mode optical fiber 124. The DC bias current to the laser source 122 is 50 mA and the optical power coupled into the optical fiber 124 is 1.6 mW.

Referring to FIG. 4(b), a reception network 126 includes a lightwave receiver 128 coupled to the optical fiber 124. The lightwave receiver 128 includes a linear p-i-n photodiode followed by a transimpedance amplifier and is used to convert the optical signal back to the electrical CATV signal 130. In the electrical CATV signal 130, there are fifty-nine transmitted CATV carriers with a single BPSK modulated digital channel occupying the slot for channel twenty-four in the CATV signal 130.

The digital data modulating channel twenty-four is reconstructed by splitting 131 channel twenty-four 132 from the other fifty-nine channels 134 of the CATV signal 130. The BPSK carrier in channel twenty-four is isolated using a bandpass filter 136. The BPSK carrier is then amplified 138. The amplified BPSK carrier 140 is passed to a down-converting mixer 142. The down-converting mixer 142 mixes the amplified BPSK carrier 140 with a replica 144 of the original carrier frequency (e.g., 229.25 MHz) to recover the CDMA baseband signal 146. The CDMA baseband signal 146 is filtered 148.

According to the invention, there is minimal degradation of the transmitted digital signal because the linearity and noise requirements for CATV transmission far exceed that required for digital transmission. For demodulated 2 MHz data after transmission with an optical modulation depth of $m_{BPSK}$=1.54%, the quality of the received signal at lightwave receiver 128 is more than sufficient for error-free data reconstruction.

The quality of the hybrid subcarrier multiplexed AM-VSB/BPSK optical fiber transmission and reception system is sufficient for error-free data reconstruction of a received digital signal. The substituted channel hybrid system enables moderate bandwidth digital transmission over existing CATV infrastructure which is useful for cost effective cellular transmission.

While particular forms of the invention have been illustrated and described, it will also be apparent that various modifications can be made without departing from the spirit and scope of the invention.

What is claimed is:

1. A method for wireless voice and data transmission and reception, comprising the steps of:

modulating a baseband signal onto a first carrier signal having a designated cable frequency to generate a modulated first carrier signal;

the baseband signal has a symbol rate in the range from 1.228 Mb/s to 2.0 Mb/s;

the modulated first carrier signal has a bandwidth less than or equal to 2.5 MHz;

combining the modulated first carrier signal into a channel at the designated cable frequency of a CATV signal having two or more channels, wherein the two or more channels include a lowest frequency channel at a lowest frequency of the CATV signal and a highest frequency channel at a highest frequency of the CATV signal, and the designated cable frequency is greater than the lowest frequency of the CATV signal and less than the highest frequency of the CATV signal;

optically coupling a laser signal into a fiber link responsive to the CATV signal;

converting the laser signal from the fiber link into the CATV signal;

splitting the modulated first carrier signal from the CATV signal;

demodulating the modulated first carrier signal to recover the baseband signal; and mixing the baseband signal onto a second carrier signal having a designated wireless frequency.

2. The method of claim 1, further comprising the step of: broadcasting the second carrier signal using an antenna.

3. The method of claim 1, wherein the fiber link includes: an optical fiber coupled to receive the laser signal, and a bidirectional optical receiver coupled to receive the laser signal from the optical fiber converting the laser signal into the CATV signal.

4. The method of claim 1, wherein:

the baseband signal is presented in a format selected from the group consisting of CDMA, TDMA, and FDMA.

5. The method of claim 1, further comprising the steps of:

receiving a radio signal from free space using the antenna; and coupling the radio signal into the fiber link.

6. A wireless transmission and reception system, comprising:

means for modulating a baseband signal onto a first carrier signal having a designated cable frequency to generate a modulated first carrier signal;

the baseband signal has a symbol rate in the range from 1.228 Mb/s to 2.0 Mb/s;

the modulated first carrier signal has a bandwidth less than or equal to 2.5 MHz;

means for combining the modulated first carrier signal into a channel at the designated cable frequency of a CATV signal having two or more channels; wherein the two or more channels include a lowest frequency channel at a lowest frequency of the CATV signal and a highest frequency channel at a highest frequency of the CATV signal, and the designated cable frequency is greater than the lowest frequency of the CATV signal and less than the highest frequency of the CATV signal;

means for optically coupling a laser signal into a fiber link responsive to the CATV signal;

means for converting the laser signal from the fiber link into the CATV signal;

means for splitting the modulated first carrier signal from the CATV signal;

means for demodulating the modulated first carrier signal to recover the baseband signal;

means for mixing the baseband signal onto a second carrier signal having a designated wireless frequency; and an antenna for broadcasting the second carrier signal.

7. The wireless transmission and reception system of claim 6, wherein:

the means for modulating uses a modulation technique selected from the group consisting of phase shift keying and quadrature amplitude modulation.

8. The wireless transmission and reception system of claim 6, further comprising:

a circulator coupled to the antenna receiving a radio signal from free space; and a bidirectional optical receiver for coupling the radio signal into the fiber link.

9. The wireless transmission and reception system of claim 6, further comprising:

means, coupled to the means for combining, for generating the CATV signal having two or more channels.

10. A transmission and reception system, comprising:

a modulator outputting a carrier signal modulated by a baseband signal;

the baseband signal has a symbol rate in the range from 1.228 Mb/s to 2.0 Mb/s;

a combiner combining the modulated carrier signal into a channel at a designated cable frequency of a CATV signal having two or more channels; wherein the two or more channels include a lowest frequency channel at a lowest frequency of the CATV signal and a highest frequency channel at a highest frequency of the CATV signal, and the designated cable frequency is greater than the lowest frequency of the CATV signal and less than the highest frequency of the CATV signal;

the modulated carrier signal has a bandwidth less than or equal to 2.5 MHz;

an analog quality laser source generating a laser signal responsive to the CATV signal;

a fiber link receiving the laser signal from the laser source and converting the laser signal into the CATV signal;

a splitter splitting the modulated carrier signal from the CATV signal; and a demodulation circuit recovering the baseband signal from the modulated carrier signal.

11. The system of claim 10, wherein the fiber link includes:

an optical fiber coupled to receive the laser signal from the laser source, and an optical receiver coupled to receive the laser signal from the optical fiber and for converting the laser signal into the CATV signal.

12. The system of claim 10, further comprising:

a bandpass filter coupled to the splitter filtering the modulated carrier signal; and an amplifier coupled to the bandpass filter amplifying the modulated carrier signal.

13. The system of claim 10, further comprising:

a low pass filter coupled to the demodulation circuit filtering the recovered baseband signal.

14. A wireless transmission and reception system, comprising:

a modulator modulating a baseband signal onto a first carrier signal having a designated cable frequency;

the baseband signal has a symbol rate in the range from 1.228 Mb/s to 2.0 Mb/s;

the modulated first carrier signal has a bandwidth less than or equal to 2.5 MHz;

a combiner combining the modulated first carrier signal into a channel at the designated cable frequency of a CATV signal having two or more channels; wherein the two or more channels include a lowest frequency channel at a lowest frequency of the CATV signal and a highest frequency channel at a highest frequency of the CATV signal, and the designated cable frequency is greater than the lowest frequency of the CATV signal and less than the highest frequency of the CATV signal;

an analog quality laser source generating a laser signal based on the CATV signal;

a fiber link receiving the laser signal from the laser source and converting the laser signal into the CATV signal;

a splitter coupled to the fiber link splitting the modulated first carrier signal from the CATV signal;

a demodulator to recover the baseband signal from the modulated first carrier signal;

an upconverter to modulate the recovered baseband signal onto a second carrier signal having a designated wireless frequency; and an antenna to broadcast the modulated second carrier signal into free space.

15. The transmission and reception system of claim 14, further comprising:

an amplifier coupled to the fiber link for amplifying the CATV signal.

* * * * *